Jan. 1, 1929.  1,697,438
J. H. WAGENHORST
METHOD OF MAKING RUBBER TIRED WHEELS
Filed April 7, 1924   3 Sheets-Sheet 1

Jan. 1, 1929.

J. H. WAGENHORST 1,697,438

METHOD OF MAKING RUBBER TIRED WHEELS

Filed April 7, 1924      3 Sheets-Sheet 3

Inventor
J. H. Wagenhorst
By Hull Brock & West
Attys.

Patented Jan. 1, 1929.

1,697,438

UNITED STATES PATENT OFFICE.

JAMES H. WAGENHORST, OF JACKSON, MICHIGAN.

METHOD OF MAKING RUBBER-TIRED WHEELS.

Application filed April 7, 1924. Serial No. 704,694.

This invention relates generally to a method of making wheels and more particularly to automobile wheels having cushion tires. Heretofore, cushion tires have been employed for trucks and similar vehicles. Some of these cushion tires have been solid, and others have been made with a central circumferential air chamber, while others have had air chambers variously disposed. Most of these cushion tires have been vulcanized to a band or base which has been either permanently or demountably attached to a wheel body. The wheel body has heretofore been fabricated as a finished product, and the cushion tire as a finished product has been subsequently applied, either permanently or demountably as before mentioned.

It has also been usual to employ very heavy flat rim bases to which the cushion tires have been vulcanized, and in some instances these cushion tires have been made solid, and in others they have been formed with a central air chamber; the rim base being practically, two spaced sections connected together by bridge pieces for the purpose of permitting the chamber forming core to be removed.

The object of my invention is to provide a wheel body embodying a plurality of spokes and a comparatively light weight sheet metal tire carrying rim or felly to which the rubber compound is directly applied and subsequently vulcanized.

By providing the finished wheel and building the cushion tire directly upon the sheet metal tire carrying rim or felly, considerable time and labor is saved and a complete wheel with cushion tires permanently connected thereto is provided.

It is also an object of my invention to provide for the fabrication upon a sheet metal wheel rim or felly of a cushion tire having a central air chamber, by providing soluble cores which can be removed after the vulcanization of the tire has been accomplished.

Another object of my invention is to provide a suitable filler in connection with the sheet metal tire carrying rim or felly, to economize in the use of the rubber compound, and also to provide additional strength for withstanding the pressures to which the tire and rim are subjected during vulcanization.

With these various objects in view, the invention consists in the novel features of construction, and in the manner of combining or arranging the same, all of which will be fully described hereinafter and set forth in the appended claims.

Figure 1:
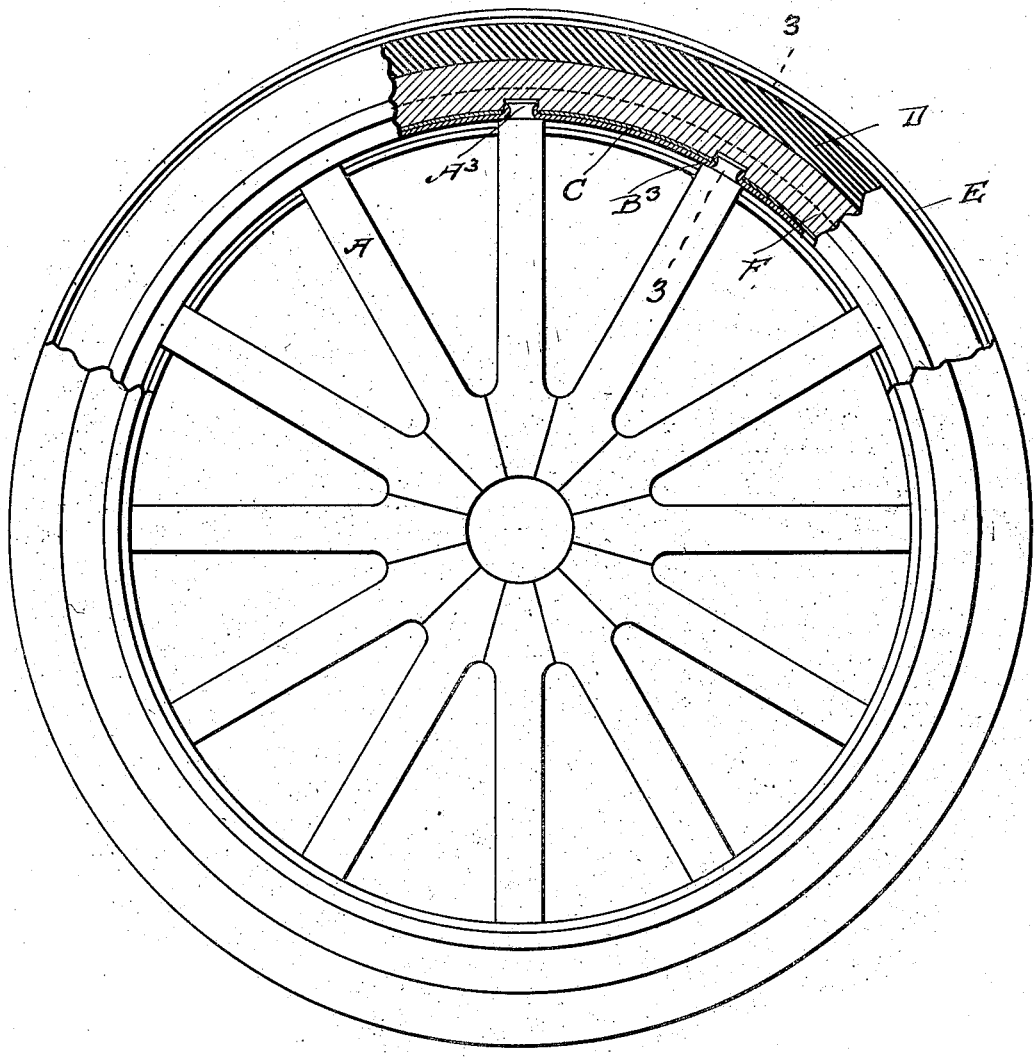
Figure 2:
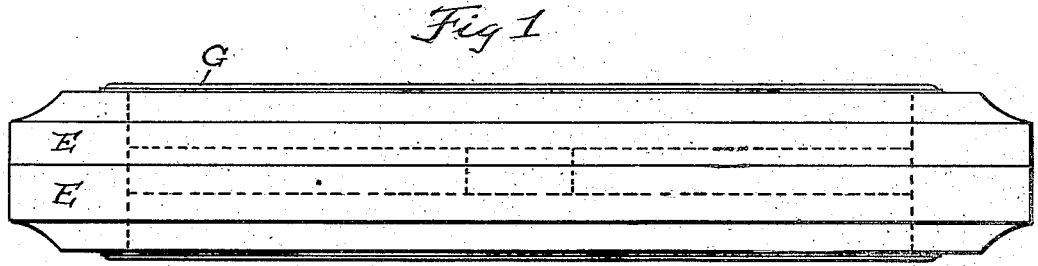
Figure 3:
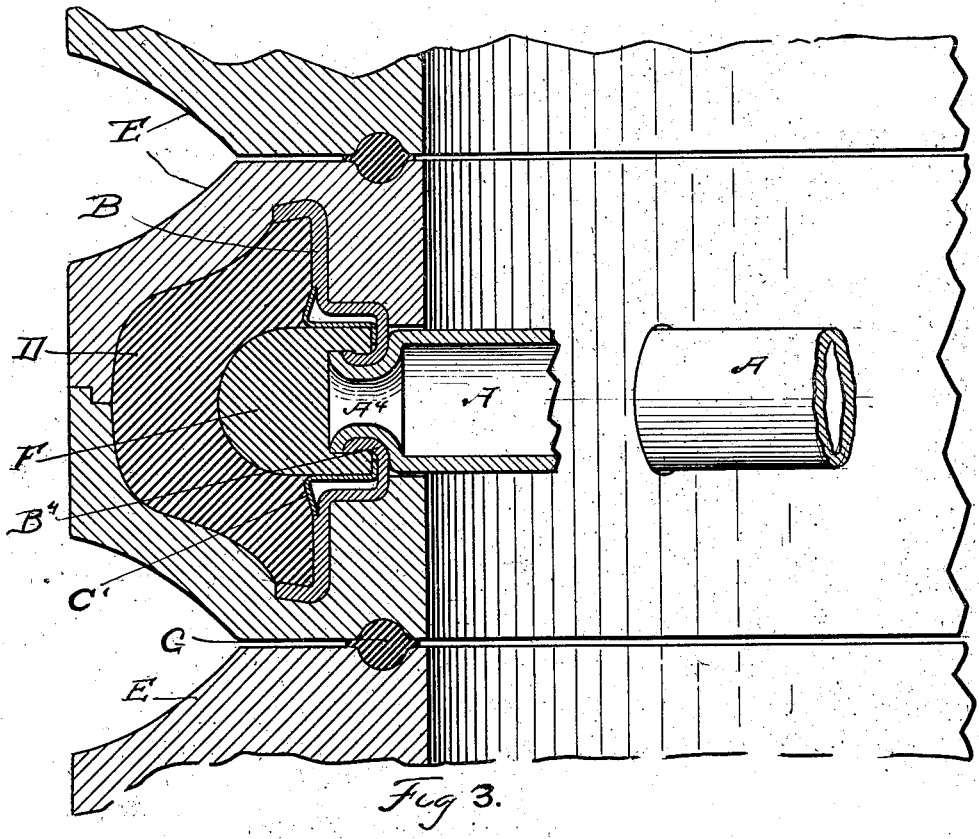
Figure 4:
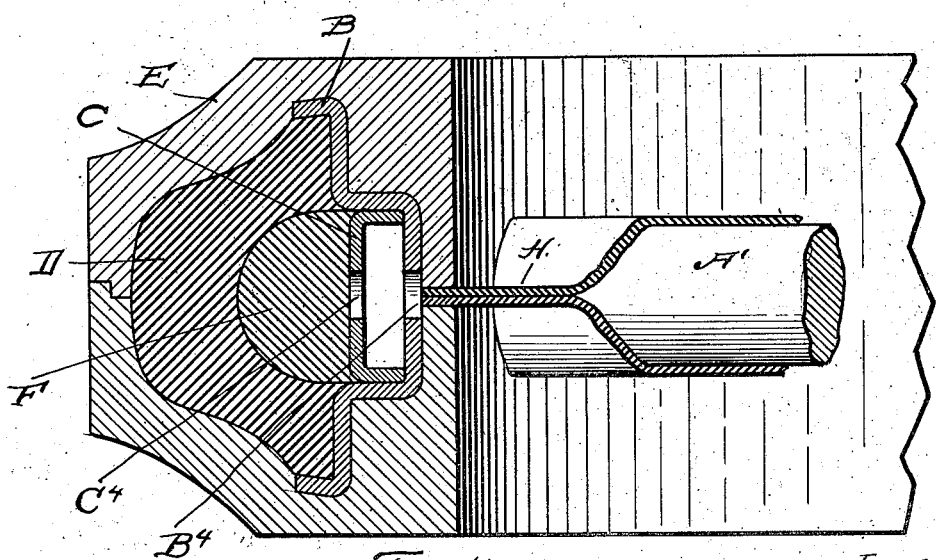
Figure 5:
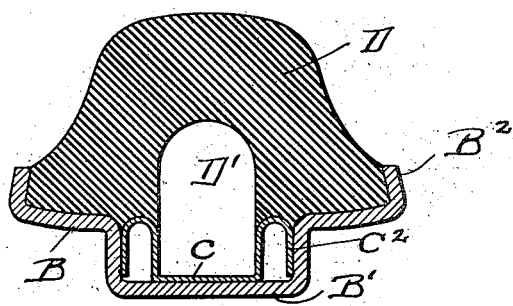
Figure 6:
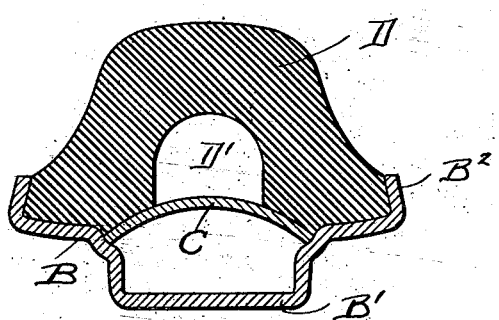
Figure 7:
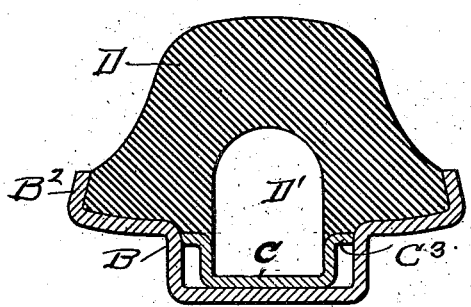

In the drawings forming a part of this specification, Fig. 1 is a plan view partly in section of a wheel and mold for molding the tire direct upon the wheel body; Fig. 2 is an edge view of the mold with wheel therein; Fig. 3 is a sectional view on the line 3—3 of Fig. 1; Fig. 4 is a similar view showing the means employed in molding the tire upon a wooden spoked wheel; Figs. 5, 6 and 7 are sectional views showing different form of fillers.

In carrying out my invention I employ a plurality of spokes which may be of metal, as indicated at A in Figs. 1 and 3, or they may be of wood as indicated at A' in Fig. 4. These spokes are assembled within, and permanently connected to a continuous or unbroken sheet metal felly or tire carrying rim B, which is preferably formed with a central inwardly projecting portion B', and tire engaging or retaining flanges $B^2$.

Suitable sockets $B^3$ are produced in the central portion of the felly or rim for the entrance of the spoke tenons, and when metallic spokes are employed the tubular tenon $A^3$, at the end of the spoke is rolled over upon the socket portion $B^3$ of the felly or rim. It will of course be understood that the rim can be of any desired shape, in cross section but the forms shown in Figs. 5, 6 and 7 are the preferred forms.

After the rim has been shaped, sized, applied, and secured to the spokes, I preferably arrange a sheet metal filler C within the rim, and this sheet metal filler may be arched in shape as shown in Fig. 6, or it may be channel shaped with the side legs thereof turned in opposite directions and engaging the legs of the central inwardly projecting portion of the rim base as shown in Figs. 3, 5 and 7 or the filler can be in the form of an inverted channel as shown in Fig. 4.

After the filler has been applied to the felly or rim, the rubber compound for making the cushion tire D is applied to said rim, and then the wheel with tire applied is placed in a mold E to be vulcanized.

In case it is desired to provide a central air chamber D', and this is the preferred form of cushion tire at the present time, I arrange a core F within the filler, or upon the filler, before the rubber compound is applied.

This core is preferably of some gluten or similar composition which will provide the necessary strength and rigidity, but which can be dissolved by the use of steam or hot water after vulcanization has taken place.

In Fig. 4, I arrange the core upon the inverted channel filler, whereas in Fig. 3 the core is arranged within the filler which is formed with oppositely disposed flanges C' which contact with the side portions of the rim base.

In Fig. 5, I have shown still another form of filler in which the side flanges $C^2$ thereof are turned down so as to rest within the side walls of the central inwardly projecting portion of the tire carrying rim.

In Fig. 7, the legs of the filler are provided with flanges $C^3$ which extend out to and contact with but do not rest upon the side walls of the inwardly projecting portion of the tire carrying rim. In Figs. 5, 6 and 7, the core has been removed, whereas in Figs. 1, 3 and 4, the cores are still in place.

In Figs. 1, 3 and 4 the wheel with the rim connected thereto and the core and tire are shown within a two-piece mold E and a series of these molds are arranged one upon the other with an interposed packing ring of rubber G. A series of these molds is then placed in the vulcanizer and subjected to the proper degree of heat and pressure to accomplish the vulcanization.

After vulcanization has taken place, the molds are removed and separated, and the core is dissolved or washed out thus producing a complete wheel with cushion tire vulcanized to the rim or felly.

When wooden spokes are employed it will of course be necessary to protect them from the action of steam and heat during the vulcanizing operation, and this I accomplish by providing rubber mats H which are laid upon opposite sides of the spokes and are brought together and held between the edges of the mold, as most clearly shown in Fig. 4. By means of this mat, thus arranged the steam will be excluded from the wooden spokes, and after vulcanization has been accomplished and the mold is separated, the rubber mats will of course be removed so that the dissolving or washing operation can take place.

When the inverted channel filler is employed, it is perforated at certain points as shown at $C^4$ in Fig. 4 and the inwardly projecting portion of the rim is also perforated at $B^4$ so that steam or hot water can be introduced through the base and filler to the composition core, it being understood that steam or hot water is introduced through certain openings, and the dissolved core discharged through other openings.

The mold sections completely envelope the rim as well as the tire, and also tightly embrace the spoke ends without the mats, in case metallic spokes are employed, and with the mats, in case wooden spokes are employed. The cores together with the filler prevent breaking down during the heat and pressure of vulcanization.

It will thus be seen that I provide a new article of manufacture consisting of a wheel body comprising spokes and a sheet metal tire carrying rim or felly to which the cushion tire is directly applied and vulcanized after the wheel body has been completed, and it will also be noted that I provide a simple and efficient method or process of producing this new article of manufacture.

Having thus described my invention, what I claim is:—

1. The herein described method which consists in providing a sheet metal rim having tire retaining flanges, and arranging a filler thereon, applying a soluble core to said filler and rim, applying a rubber tire to said core and rim, vulcanizing the tire upon said core and rim and subsequently dissolving the core, leaving the vulcanized tire upon the filler and rim.

2. The herein described method which consists in providing a sheet metal rim, connecting a plurality of spokes to said rim, applying a filler to said rim, applying a soluble core upon said filler, applying a rubber tire to said core and rim, vulcanizing said tire upon said rim with spokes connected and subsequently dissolving said core and leaving said tire with centrally disposed air space.

3. The herein described method which consists in providing a wheel comprising a sheet metal rim having spokes connected thereto, applying a core to said rim, applying a rubber tire to said core and rim, arranging the tire and rim within a mold and protecting the spokes from steam and then vulcanizing the tire upon said rim.

4. The herein described method which consists in providing a wheel body comprising spokes and a sheet metal rim, applying a rubber tire to said rim, placing said wheel body with tire in a suitable mold, and protecting the spokes against heat and moisture, and then vulcanizing the tire upon the rim.

5. The method of making rubber tired wheels, comprising the assembling of a wheel body within and permanently connecting it to a sheet metal rim, mounting a sheet metal filler in said rim, applying vulcanizable rubber compound to said rim, and vulcanizing said rubber compound upon the rim to form a resilient tire permanently attached to the periphery of the wheel.

6. The method of making rubber tired wheels, comprising the assembling of a plurality of spokes within a sheet metal rim, applying vulcanizable rubber compound to said rim, enclosing the rim portion of said wheel in a mold, stacking a plurality of said molds in a vulcanizer with steam-tight packing interposed between adjacent molds to prevent access of steam to the wheel spokes, and applying heat and pressure to vulcanize said rubber compound upon the rims.

In testimony whereof, I hereunto affix my signature.

JAMES H. WAGENHORST.